(12) United States Patent
Steiner (10) Patent No.: US 8,699,696 B1
(45) Date of Patent: Apr. 15, 2014

(54) SYSTEM AND METHOD FOR EFFICIENTLY MANAGING LARGE CONTACT CENTERS

(71) Applicant: Avaya Inc., Basking Ridge, NJ (US)

(72) Inventor: Robert C. Steiner, Broomfield, CO (US)

(73) Assignee: Avaya Inc., Basking Ridge, NJ (US)

( * ) Notice: Subject to any disclaimer, the term of this patent is extended or adjusted under 35 U.S.C. 154(b) by 0 days.

(21) Appl. No.: 13/630,152

(22) Filed: Sep. 28, 2012

Related U.S. Application Data (63) Continuation-in-part of application No. 13/186,219, filed on Jul. 19, 2011.

(51) Int. Cl.
*H04M 3/00* (2006.01)
*H04M 5/00* (2006.01)

(52) U.S. Cl.
USPC ............ 379/265.11; 379/265.02; 379/265.05; 379/265.12; 379/265.13

(58) Field of Classification Search
USPC ............. 379/265.02, 265.06, 265.13, 265.05, 379/265.11, 265.12, 265.01
See application file for complete search history.

(56) References Cited

U.S. PATENT DOCUMENTS

| | | | |
|---|---|---|---|
| 5,903,641 A | 5/1999 | Tonisson | |
| 7,949,121 B1 * | 5/2011 | Flockhart et al. | 379/265.02 |
| 8,116,446 B1 * | 2/2012 | Kalavar | 379/265.13 |
| 2003/0123640 A1 | 7/2003 | Roelle et al. | |
| 2004/0191735 A1 | 9/2004 | McCormack | |
| 2006/0274758 A1 | 12/2006 | Busko et al. | |
| 2010/0086120 A1 | 4/2010 | Brussat et al. | |
| 2011/0255682 A1 | 10/2011 | Flockhart et al. | |
| 2011/0255684 A1 | 10/2011 | Flockhart et al. | |
| 2012/0224682 A1 | 9/2012 | Zgardovski et al. | |
| 2013/0022194 A1 * | 1/2013 | Flockhart et al. | 379/265.06 |

OTHER PUBLICATIONS

Official Action for U.S. Appl. No. 13/186,219 mailed Mar. 27, 2013), 18 pages.
Final Action for U.S. Appl. No. 13/186,219 mailed Oct. 3, 2013, 19 pages.

* cited by examiner

*Primary Examiner* — Thjuan K Addy
(74) *Attorney, Agent, or Firm* — Sheridan Ross P.C.

(57) ABSTRACT

Provided is a system and method that identifies a characteristic associated with a resource. A resource can be, for example, an agent in a contact center. An identifier, representing the characteristic is associated with the resource (e.g., a bit) is stored in a first memory location. A characteristic associated with a work item is identified. The characteristic associated with the work item can be for example, a type of communication (e.g., email, voice, video, etc.), a company represented by the work item, and the like. The identifier representing the characteristic associated with the work item is stored in a second memory location. The first memory location is bit masked and compared with the second memory location to determine if the resource should process the work item. In response to determining that the resource should process the work item, the work item is routed to the resource, such as an agent.

20 Claims, 8 Drawing Sheets

SYSTEM AND METHOD FOR EFFICIENTLY MANAGING LARGE CONTACT CENTERS

RELATED U.S. PATENT APPLICATION DATA

The present application claims the benefit under 35 U.S.C. 120 as a continuation-in-part of currently pending U.S. patent application Ser. No. 13/186,219, filed Jul. 19, 2011, entitled "Agent Skill Promotion and Demotion Based on Contact Center State", which is incorporated herein by reference.

TECHNICAL FIELD

The systems and methods relate to contact centers and in particular to management of contact centers.

BACKGROUND

When contact centers were initially developed, the number of agents that were supported was limited; in addition, the types of communication supported were also limited. Today, this is not the case. The contact centers of today support large numbers of agents or resources ranging into the tens of thousands. Moreover, many of these contact centers are distributed across various locations. Today's contact centers also support a variety of mediums, such as voice, video, email, Instant Messaging (IM), text messaging, blogs and the like.

As contact centers have evolved, in many instances, code from earlier version of the contact centers was ported into newer version of the contact centers. As a result, supporting a high number of resources has become difficult to obtain using technology that was previously developed for contact centers designed to support a smaller number of agents. What is need is a new paradigm that changes existing processes that match communications to resources in today's call centers.

SUMMARY

Systems and methods are provided to solve these and other problems and disadvantages of the prior art. Provided is a system and method that identifies a characteristic associated with a resource. A resource may anything that can process, receive, store, and/or handle a work item. For example, a resource can be an agent, a Personal Computer (PC), a telephone, a video system, a cellular telephone, a Personal Digital Assistant (PDA), a tablet device, a notebook device, a communication device, a speaker, a FAX machine, a terminal, a printer, a storage space, an agent, a software process, and/or the like. An identifier, representing the characteristic is associated with the resource (e.g., a bit) is stored in a first memory location. The characteristic(s) associated with the resource can include a variety of characteristics. For example, the characteristic(s) associated with the resource may be that the resource is enabled (a agent is logged in or not), ready (an agent is ready to process a work item or not), interruptible (an agent can be interrupted to process another work item or not), supports a specific skill level, can support a specific type of customer (i.e., a gold or platinum customer), can support a work item representing a specific type or monetary range, can speak a specific language, can support a specific product or product type, is a specific automobile (i.e., for a specific taxi), a specific space on a shelf, and/or the like. The characteristic(s) can be based on a status, such as an agent is enabled or ready. Likewise, the characteristic may be based on a rule.

A characteristic associated with a work item is identified. The characteristic(s) associated with the work item can include a variety of characteristics. For example, the characteristic(s) associated with the work item can be a type of communication (e.g., a voice call or email), a customer type (e.g., gold or platinum), a time since the work item was received, a company name, a product, a trouble ticket for a specific product, a language, a customer name, and/or the like. The characteristic(s) can be based on a status, such as the work item is an English communication or a voice communication. Likewise, the characteristic may be based on a rule. The identifier representing the characteristic associated with the work item is stored in a second memory location. The first memory location may be bit masked and/or compared with the second memory location to determine if the resource should process the work item. In response to determining that the resource should process the work item, the work item is routed to the resource, such as an agent.

In an embodiment, the characteristic associated with the resource is derived from three characteristics associated with the resource. The three characteristics are enabled, ready, and interruptible. In addition, the resource may be an agent.

In an embodiment, the characteristic associated with the resource includes a plurality of characteristics associated with the resource. Each of the plurality of characteristics associated with the resource are associated with a rule or status.

In an embodiment, the characteristic associated with the work item includes a plurality of characteristics associated with the work item. Each of the plurality of characteristics associated with the work item are associated with a rule or status.

In an embodiment, the characteristic associated with the resource comprises a plurality of characteristics associated with the resource. Each of the plurality of characteristics associated with the resource includes a corresponding identifier stored in a bit in the first memory location. The characteristic associated with the work item comprises a plurality of characteristics associated with the work item. Each of the characteristics associated with the work item comprises a corresponding identifier stored in a bit in the second memory location. The bits that represent the plurality corresponding identifiers associated with the resource are individually bit masked and compared with the bits that represent the plurality of corresponding identifiers associated with the work item.

In an embodiment, the characteristic associated with the resource comprises a plurality of characteristics associated with the resource. Each of the plurality of characteristics associated with the resource includes a corresponding identifier stored in a bit in the first memory location. The characteristic associated with the work item includes a plurality of characteristics associated with the work item. Each of the characteristics associated with the work item includes a corresponding identifier stored in a bit in the second memory location and wherein each bit in the first and second memory locations are bit masked and compared at the same time.

In an embodiment, an event is detected. An event can be, for example, a change in a status of an agent. The identifier representing the characteristic associated with the first resource or the characteristic associated with the work item is updated based the event.

In an embodiment, the event is placed in an event queue.

In an embodiment, a determination is made to see if the resource (e.g., an agent in a contact center) wants to process the work item. In response to determining that the resource does not want to process the work item, the work item is resubmitted into a work item pool. A determination is made to see if a second resource can process the work item.

In an embodiment, a non-transient computer readable medium having stored thereon instructions that cause a processor to execute a method is used. The method generates an abstract tree syntax from a code base. A characteristic associated with at least one of a resource or a work item is identified. The abstract tree syntax is searched for one or more instances of the characteristic. The one or more instances of the characteristic are identified. Code is generated in an event service routine to update the identified one or more instances of the characteristic.

In an embodiment, a rule change is detected. The abstract tree syntax is rebuilt. Any changes to the one or more instances of the characteristic are identified. The code in the event service routine is changed based on the rule change.

DETAILED DESCRIPTION

Figure 1:
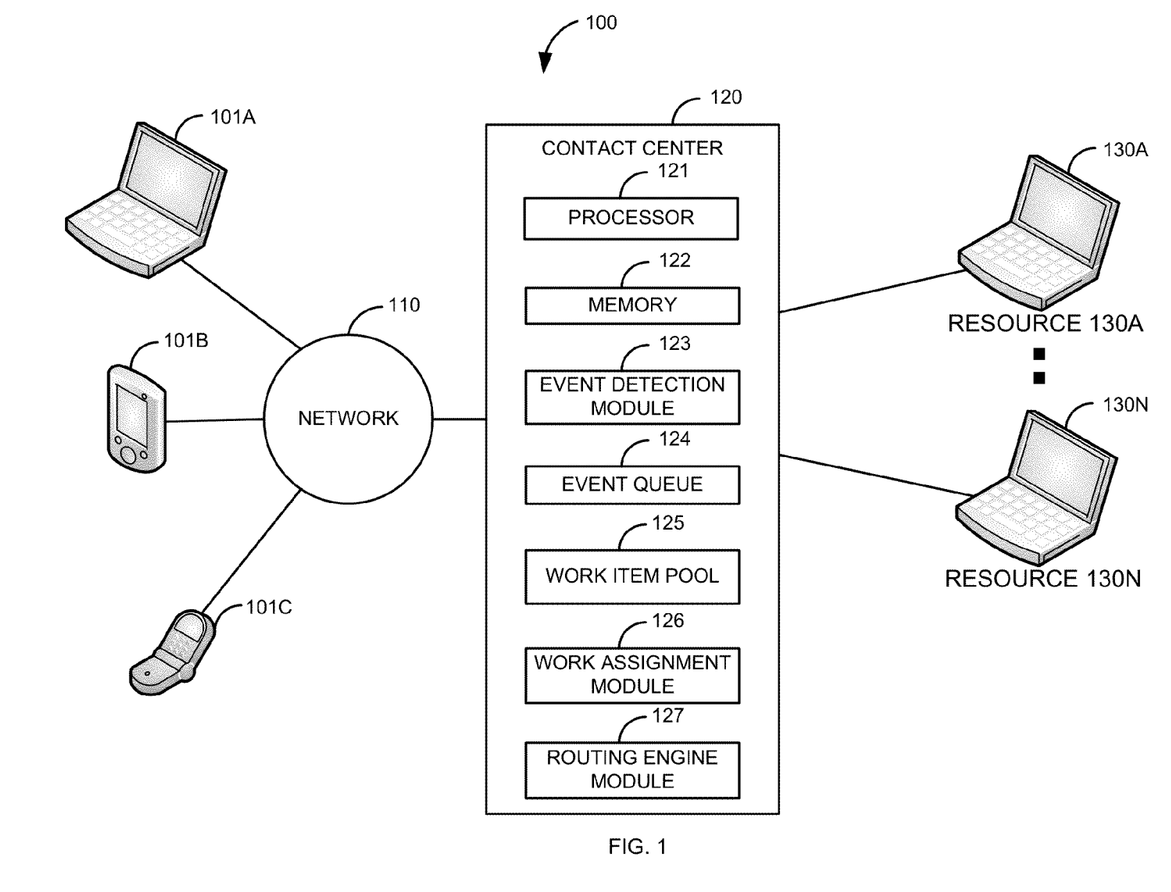
FIG. 1 is a block diagram of an illustrative system for managing a contact center.

FIG. 1 is a block diagram of an illustrative system 100 for managing a contact center 120. The first illustrative system 100 includes communication devices 101-101C, a network 110, the contact center 120, and resources 130A-130N.

The communication device 101 may be any device that can communicate on the network 110, such as a Personal Computer (PC), a telephone, a video system, a cellular telephone, a Personal Digital Assistant (PDA), a tablet device, a notebook device, a server, a process running on communication device 101, a blog site, a tweet, a sensor, and the like. Although not shown in FIG. 1, any number of communication devices 101 may be connected to network 110, including only a single communication device 101. In addition, the communication device 101 may be directly connected to the contact center 120.

The network 110 can be any network that can send and receive information, such as the Internet, a Wide Area Network (WAN), a Local Area Network (LAN), the Public Switched Telephone Network (PSTN), a packet switched network, a circuit switched network, a cellular network, a combination of these, and the like. The network 110 can use a variety of protocols, such as Ethernet, Internet Protocol (IP), Session Initiation Protocol (SIP), Integrated Services Digital Network (ISDN), and the like.

The contact center 120 can be any contact center that can process work items. The contact center 120 can include a Private Branch Exchange, a telephone switch, an email server, a video server, an Instant Messaging (IM) system, a web server, a blog monitoring service, an out-bound dialer, an Interactive Voice Response (IVR) system, any combination of these, and the like. The contact center 120 further comprises a processor 121, a memory 122, an event detection module 123, an event queue 124, a work item pool 125, a work assignment module 126, and a routing engine 127. Although the various elements 121-127 in the contact center 120 are shown in a single contact center 120, elements 121-127 may be distributed across multiple systems including communication devices 101A-101C and resources 130A-130N.

The processor 121 can be any processor that can execute instructions, such as a microprocessor, a multi-core processor, a digital signaling processor, a micro-controller, a computer, a specialized processor, and/or the like. The memory 122 can be any type of memory that can store information, such as a Random Access Memory (RAM), a flash memory, a cache memory in the processor 121, a register in the processor 121, a hard disk, a flash drive, and/or the like.

The event detection module 123 can be any hardware/software that can detect events. For example, the event detection module 123 can be a fingerprint scanner that logs an agent into the contact center 120, an RFID scanner, a time clock, a software process for detecting software events, code in an interrupt service routine, an email system that detects incoming emails, a Private Branch Exchange that detects incoming or outgoing calls, and/or the like. The event queue 124 can be any hardware/software that can process events that are queued and later serviced by the event detection module 123.

The work item pool 126 can be any hardware/software that can process work items, such as a queue, a linked list, a software process, a first-in-first out (FIFO), and/or the like. The work assignment module 126 can be any hardware/software that can manage a work item, such as, a communication manager, a Private Branch Exchange (PBX), a communication system, and/or the like. The routing engine 127 can be any hardware/software that can route a work item. For example, the routing engine 127 can be an email system (that sends an email to the resource 130), a PBX that connects a call to resource 130, an Instant Messaging server, a text messaging service, a video switch, and/or the like.

The resource 130 may anything that can process, receive, store, and/or handle a work item. For example, the resource 130 can be a Personal Computer (PC), a telephone, a video system, a cellular telephone, a Personal Digital Assistant (PDA), a tablet device, a notebook device, the communication device 101, a speaker, a FAX machine, a terminal, a printer, a storage space, an agent, a software process, a taxi, a car, a truck, and/or the like. The resource 130 may connect to the contact center 120 via the network 110. The resource 130A-130N can comprise any number of resources, including only a single resource.

An in-bound work item is received at the contact center 120. A work item may be any type of communication, such as, a voice communication from a user at communication device 101C, a video communication from a user at communication device 101A, an email communication from a user at communication 101B, a text message, a posting on a blog, an Instant Message (IM), a FAX, and/or the like. Alternatively, the work item can be an out-bound work item, such as voice call that is going to be placed (by a predictive dialer) to a user of the communication device 101. An out-bound work item can include other types of communications, such as, an email, a posting on a blog site, an Instant Message (IM), a text message, and/or the like. The work item is placed in communication pool 126 to be serviced by the resource 130.

The work assignment module 126 identifies a characteristic(s) associated with the resource 130. The characteristic(s) associated with the resource 130 can include a variety of characteristics. For example, the characteristic(s) associated with the resource 130 may be that the resource 130 is enabled (logged in or not), ready (ready to process a work item or not), interruptible (can be interrupted to process another work item or not), supports a specific skill level, can support a specific type of customer (i.e., a gold or platinum customer), can support a work item representing a specific type or monetary range, can speak a specific language, can support a specific product or product type, is a specific automobile (i.e., for a specific taxi), a specific space on a shelf, and/or the like. The characteristic(s) can be based on a status, such as an agent is enabled or ready. Likewise, the characteristic may be based on a rule. For instance, the characteristic interruptible can be based on a rule that the agent may only be interrupted during defined periods identified in the agent's calendar. Other examples of rules can include, but are not limited to the resource 130 servicing a specific type of customer during heavy load periods in the contact center 120, supporting a work item in Spanish if no other Spanish agents are available, supporting a work item in a English if there are not work items in French in the work item pool 125, only supporting voice and video work items, and/or the like.

The characteristic(s) associated with the resource 130 is stored as an identifier in a location in the memory 122. The identifier is typically stored as a bit in the memory 122. However, the identifier can be stored in multiple bits, one or more bytes, one or more words, one or more longs, and/or the like. The identifier may be stored as part of a union. If there are multiple characteristics associated with the resource 130, an identifier for each characteristic is stored in a first location in the memory 122. For example, the multiple characteristics may be stored as part of an octet, a byte, word, long, long word, and/or the like in the first location in the memory 122.

The work assignment module 126 identifies a characteristic(s) associated with a work item. The characteristic(s) associated with the work item can include a variety of characteristics. For example, the characteristic(s) associated with the work item can be a type of communication (e.g., a voice call or email), a customer type (e.g., gold or platinum), a time since the work item was received, a company name, a product, a trouble ticket for a specific product, a language, a customer name, and/or the like. The characteristic(s) can be based on a status, such as the work item is an English communication or a voice communication Likewise, the characteristic may be based on a rule. For example, a rule can be that the work item is with a gold customer. Any agent that supports gold customers will be interrupted if there are no other resources 130 that support gold customers available and the agent is currently supporting a non-gold customer.

The characteristic(s) associated with the work item is stored as an identifier in a location in the memory 122. The identifier is typically stored as a bit in the memory 122. However, the identifier can be stored in multiple bits, one or more bytes, one or more words, one or more longs, and/or the like. The identifier may be stored as part of a union. If there are multiple characteristics associated with the work item, an identifier for each characteristic is stored in a second location in the memory 122. For example, the multiple characteristics may be stored as part of an octet, a byte, word, long, long word, and/or the like in the second location in the memory 122.

The work assignment module 126 bit masks the first location (the resource characteristic identifier(s)) with the second location (the work item characteristic identifier(s)). The result is then compared (i.e., doing an exclusive OR on the work item identifiers and the result of the bit mask) to determine if the resource 130 should process the work item (i.e., if the result is zero).

In response to determining that the resource 130 should process the work item, the routing engine 127 routes the work item to the resource 130. Routing the work item can be accomplished in various ways, such as, sending an email to the resource 130, sending a voice call to the resource 130, sending a video call to the resource 130, connecting the resource 130 into an out-bound call, sending the work item to be printed and stored in a storage area, sending to work item to a voice mail, connecting the resource 130 to a web site, establishing an Instant Messaging (IM) session with the resource 130.

The resource 130 can then process the work item. For example, an agent can answer a voice call, answer a video call, view an email, view a blog site, respond to a chat, respond when a customer answers an out-bound call, and/or the like. In one embodiment, the resource 130 may a storage area. The work item is printed and stored in a specific shelf in the storage area. The agent can then view the printed version of the work item. In another embodiment, the resource 130 may be a taxi/taxi driver. The work item may be a call for a taxi at a specific location. Based on the characteristic of the call (e.g., the location), the call is routed to the taxi/taxi driver that is located in the closet proximity to the caller that is not currently in transit with another customer.

In an embodiment, the resource 130 may have the option of processing the work item or not. If this option is configured, the resource 130 may be presented with a screen pop or voice call (via an automated attendant) that asks the resource 130 if he/she wants to process the work item. The agent may be presented with various types of information associated with the work item. If it is determined that the resource 130 does not want to process the work item, the work item is resubmitted into the work item pool 125. The work assignment module 126 can then determine if a different resource 130 can process the work item.

After handling the work item, the resource 130 can then set a status associated with the resource 130 based on the call. For example, if the resource 130 is handling voice calls, the resource 130, on completion of the voice call, can indicate that he/she is ready to process a new voice work item.

The characteristics associated with the resource 130 and the work item can change based on events. For example, if an agent has taken a voice call, the agent's ready status may change from ready to not ready. Likewise, a characteristic associated with a work item can change. For instance, a priority of status can change from low to high based on the work item being on hold for a defined period of time.

The event detection module 123 detects an event and updates the associated identifier representing the characteristic. For example, if the resource 130 logs out at the end of a shift, the event detection module 123 detects the event. The event detection module 123 detects the resource 130 logging out and sets the identifier associated with the characteristic enabled to not enabled. In addition the event detection module 123 could set other identifiers for other characteristics, such as, the ready characteristic (to not ready) and the interruptible characteristic (to not interruptible) based on the event of the resource 130 logging out.

Figure 2:
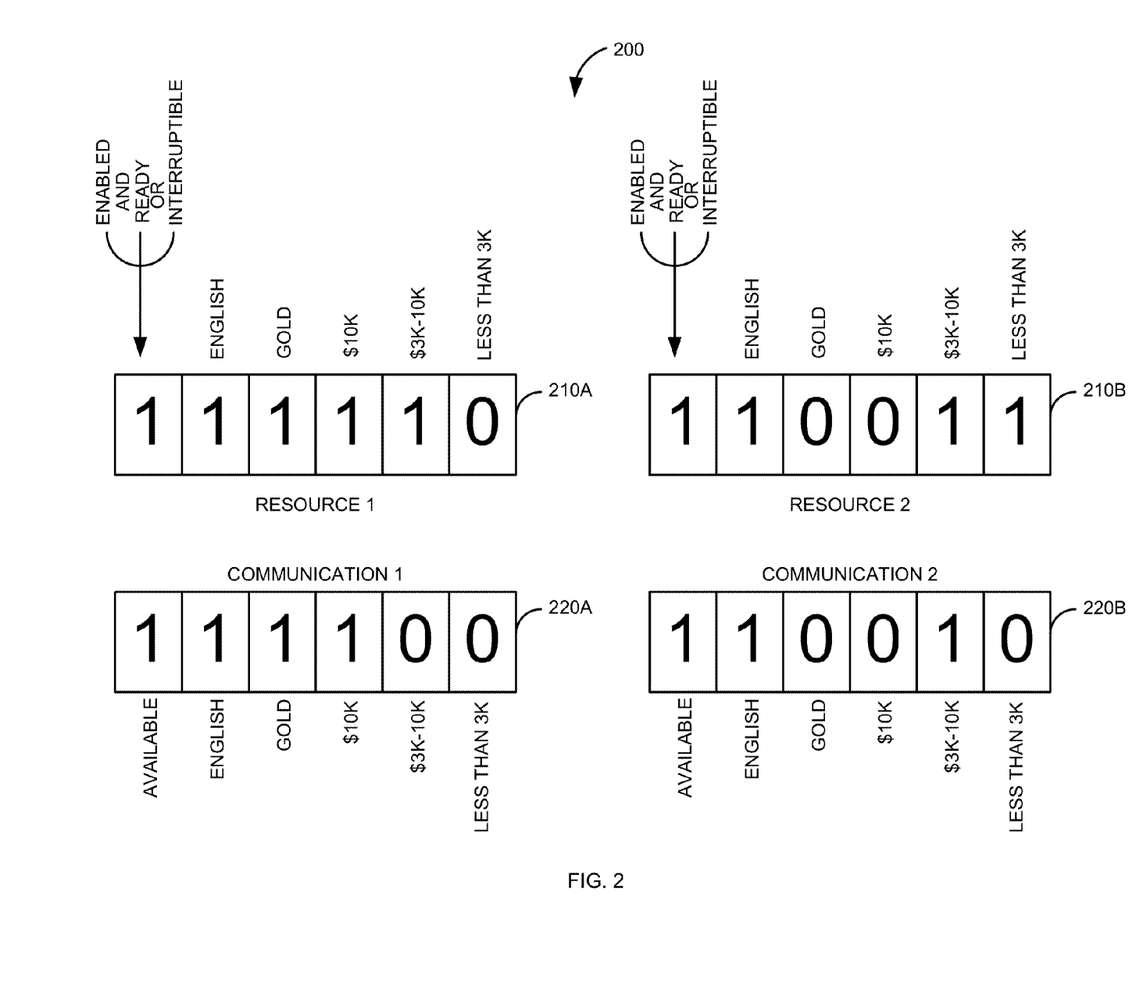
FIG. 2 is a diagram of how resource characteristics are matched to work item characteristics.

FIG. 2 is a diagram 200 of how resource characteristics are matched to work item characteristics. The diagram 200 comprises memory locations 210A and 210B that show identifiers (represented as bits) that represent characteristics for two resources. The diagram 200 also comprises memory location 220A and 220B that show identifiers (represented as bits) that represent characteristics of two work items.

The memory locations 210A and 210B show the identifiers for resource 1 and resource 2 respectively. The following discussion is in relation to both memory locations 210A (resource 1) and 210B (resource 2). The first bit (starting from left to right) is a bit that is derived from three characteristics of resource 1. The first bit is set to a 1 when the resource 130 (e.g., an agent) is enabled (logged in) and is ready (ready to work) or interruptible (is handling a work item, but can be interrupted). The second bit (English) is set to a 1 if the resource 130 can process work items in English. The third bit (Gold) is set to a 1 if the resource 130 can process Gold customers (a high value customer). The fourth bit is set to a 1 if the resource 130 can process a high value work item over $10,000 (e.g., a loan over $10,000). The fifth bit is set to a 1 if the resource 130 can process a work item with a value of between $3,000 and $10,000. The sixth bit is set to a 1 if the resource 130 can process a work item with a value less than $3,000. Note that most of these fields do not change very often and are only updated when an event is detected that requires a change.

Memory locations 220A and 220B show the identifiers for work item 1 and work item 2 respectively. The following discussion is in relation to both memory locations 220A (work item 1) and 220B (work item 2). The first bit (starting from left to right) is the available bit (indicating that the resource needs to be available to process a work item). The second bit (English) is set to a 1 if the work item is in English. The third bit (Gold) is set to a 1 if the customer is a Gold customer. The fourth bit is set to a 1 if the work item is a high value work item over $10,000 (e.g., a loan over $10,000). The fifth bit is set to a 1 if the work item has a value of between $3,000 and $10,000. The sixth bit is set to a 1 if the work item has a value of less than $3,000.

To illustrate how memory locations 210A, 210B, 220A, and 220B are used, consider the following examples. Work item 1 is received in contact center 120. Based on a phone number of the call, a called number, an IVR response, and the like, work assignment module 126 identifies that a resource 130 must be available to process the communication that the customer is English speaking, that the customer is a gold customer, and that the value of the call is worth over $10,000.

In response to the above determinations, the work assignment module 126 sets the identifiers for each characteristic in memory location 220A as shown. The work assignment module 126 first determines if resource 2 can process work item 1. To make the determination if resource 2 can process work item 1, memory location 210B (memory location for resource 2) is bit masked using memory location 220A (memory location for work item 1). The result of the bit mask is 110000 (the last two bits of memory location 220B are masked off (set to 0) because memory location 220A has the last two bits set to 0). The result is then compared to memory location 220A. In this example, memory location 220A contains 111100 and the result contains 110000. Since the two values do not match, the determination is made that resource 2 cannot process work item 1.

Next, work assignment module 126 determines if resource 1 can process work item 1. To make the determination if resource 1 can process work item 1, memory location 210A (memory location for resource 1) is bit masked using memory location 220A (memory location for work item 1). The result of the bit mask is 111100 (the last two bits of memory location 220A are masked off (set to 0) because memory location 220A has the last two bits set to 0). The result is then compared to memory location 220A. In this example, memory location 220A contains 111100 and the result also contains 111100. Since the two values match, the determination is made that resource 1 can process work item 1. Work item 1 is then routed to resource 1.

Using the above process work item 2 is received and the corresponding identifiers are set in memory location 220B.

Using the above described process, resource 1 or resource 2 could process work item 2. Which resource (resource 1 or resource 2) processes the work item can be passed on which resource is compared first or based on other characteristics of the resource or work item.

The above process uses a 1 to identify if a status as set. However, the opposite could also be used where a 0 indicates a status is set Likewise, other ways of ORing, ANDing, and bit masking can be used to accomplish the same result. The above results may be accomplished using one or more instructions in the processor 121.

In another embodiment, individual identifiers can be bit masked. For example, using work item 1, each bit that is set to a 1 in memory location 220A can be masked and compared individually to determine if the resource can process work item 1.

Figure 3:
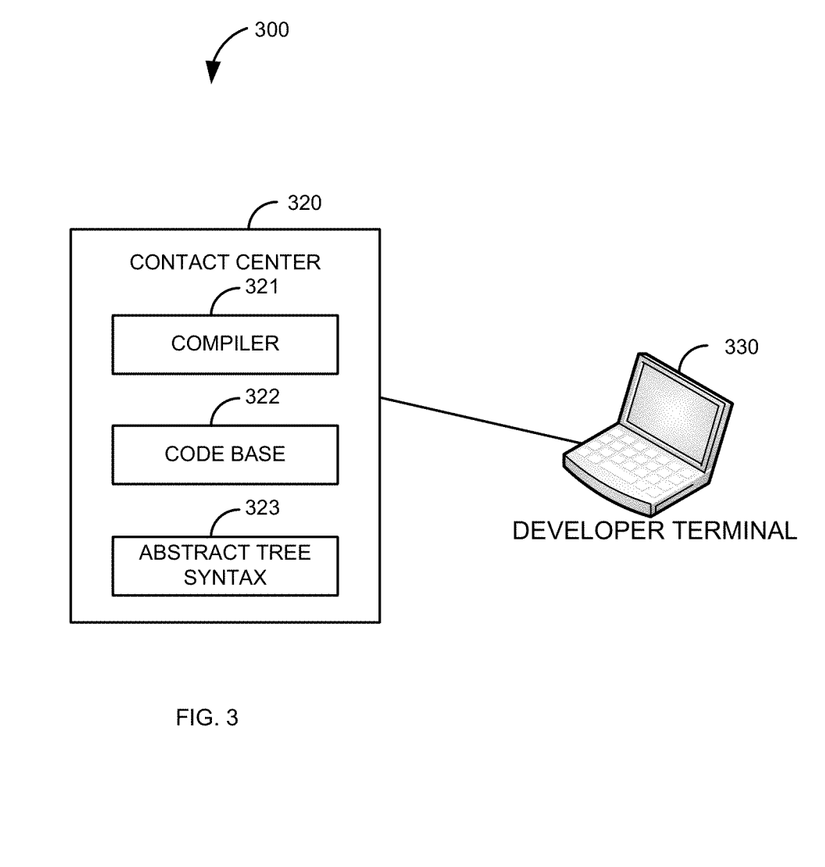
FIG. 3 is a block diagram of an illustrative system for building code in a contact center.

FIG. 3 is a block diagram of an illustrative system 300 for building code in a contact center 320. The illustrative system 300 comprises the contact center 320 and a developer terminal 330. The contact center 320 can be any contact center, such as the contact center 120. Typically, the contact center 320 will be a test contact center that a developer is using to develop code for the contact center 320. The contact center 320 further comprises a compiler 321, a code base 322, and abstract tree syntax 323.

The compiler 321 can be any compiler that can compile code, such as, a C compiler, a Java compiler, a C++ compiler, a C## compiler, an assembler, a custom compiler, and/or the like. The code base 322 can be any code base that that runs on a processor 121. The code base 322 can be based on any programming language, such as Java, C, C++, C##, HTML, shell script, Fortran, assembly code, machine code, and/or the like.

The abstract tree syntax 323 is generated by a compiler 321 from the code base 322 as is known in the art. One purpose of the abstract tree syntax 323 to allow a developer to visually see the structure of the code base 322. In addition, abstract tree syntax 323 identifies where specific variables (instances of characteristics) are used throughout the code base 322.

The developer terminal 330 may be any device that can communicate with contact center 320, such as, a Personal Computer (PC), a video system, a cellular telephone, a Personal Digital Assistant (PDA), a tablet device, a notebook device, and the like. Although only 1 developer terminal 330 is shown in FIG. 3, additional developer terminals 330 can be added as necessary to accommodate additional developers.

The compiler 321 generates abstract tree syntax 323 based on the code base 322. The compiler 321 identifies a characteristic(s) associated with a resource 130 or a work item. The characteristic associated with the resource or the work item can be any of those described previously. The compiler 321 searches the abstract tree syntax 323 for one or more instances of the characteristic. The compiler 321 identifies the one or more instances of the characteristic. The compiler 321 generates code in an event service routine. The code in the event service routine updates the one or more instances when the event occurs.

If a rule for the characteristic changes, the compiler 321 can detect the change in the rule. For example, by examining changes to code base 322. Based on the rule change, the abstract tree syntax 323 is rebuilt. The compiler 321 identifies any changes to the one or more instances of the characteristic. The compiler 321 changes the code in the event service routine based on the rule change.

The compiler can create relationships between groups of agents, queues, sites, and characteristics. Based on these relationships, the rules may change and/or the instances of the characteristics may change.

Figure 4:
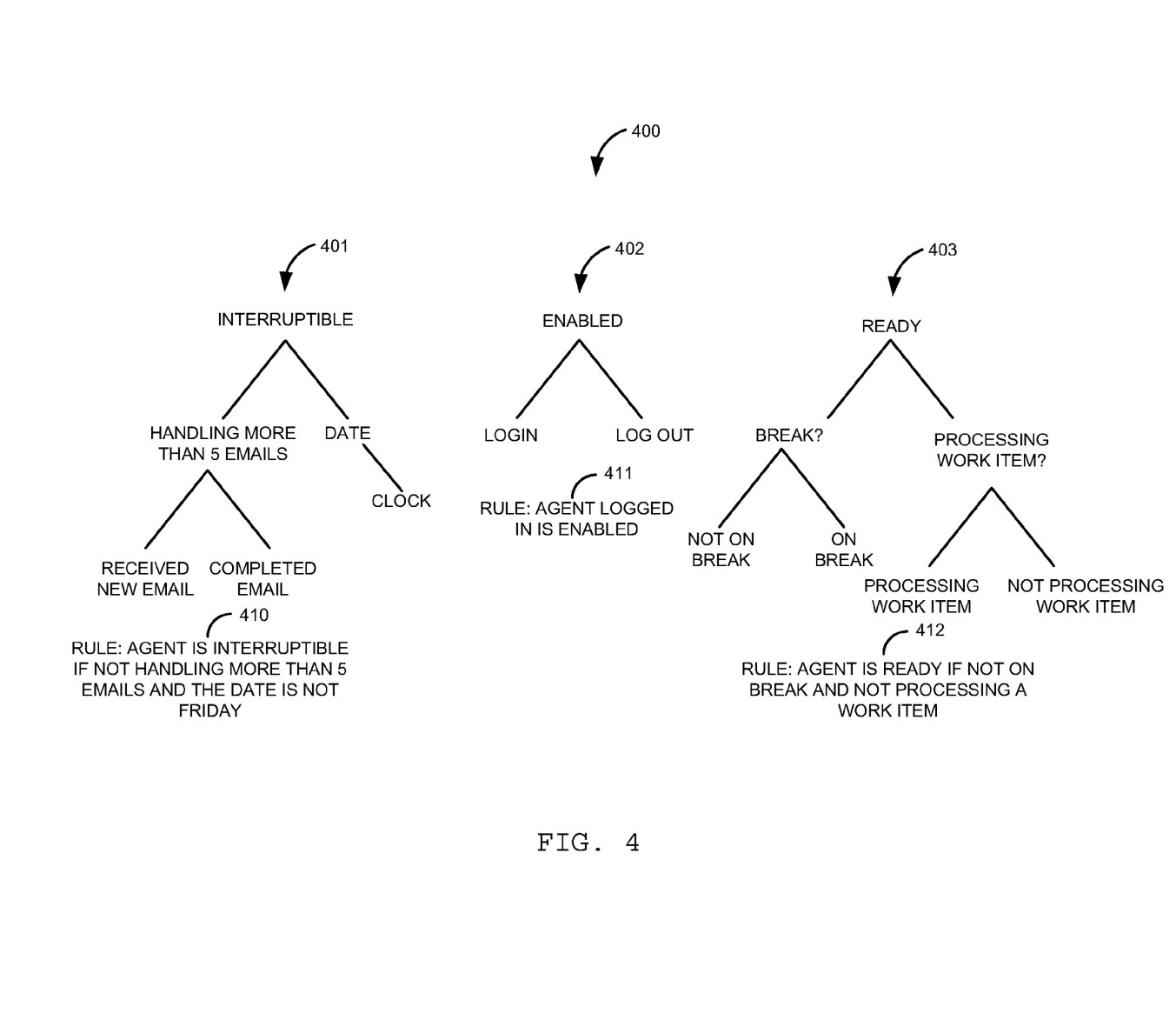
FIG. 4 is a trellis diagram defining characteristics of a resource.

FIG. 4 is an exemplary trellis diagram 400 defining characteristics of a resource 130. The trellis diagram 400 is a high level abstraction of the abstract tree syntax 323 described in FIG. 3. Three characteristics, interruptible 401, enabled 402, and ready 403 are shown. The characteristics 401-403 are for a specific agent. However, the characteristics can be for multiple agents (resources 130).

The interruptible characteristic 401 is defined by rule 410. Rule 410 states that the agent is interruptible if the agent is not handling more than 5 emails and the date is not Friday. The tree from the characteristic interruptible 401 has two branches. The first branch is the date branch. The date branch is based on the output from a clock. If the clock indicates it is Friday, the date is updated, causing an event that sets a date flag.

The second branch is the handling more than 5 emails branch. This variable changes based on the agent receiving or completing an email. If the agent receives an email, the number of emails is incremented. If the agent completes an email, the variable is decremented. When 1 of the three sources (received email, completed email, or date of the clock changes, the event service routine detects the event and updates the identifier for the interruptible characteristic.

To illustrate, assume that the interruptible identifier is set, the date is Thursday, and the agent currently is processing 4 emails. The agent receives a $5^{th}$ email. The event service routine detects that the agent has been given a new email to process. The event service routine determines that the agent is now handling 5 emails, this results in the interruptible identifier being set to not interruptible.

The rule 411 for the characteristic enabled 402 is based on two events: 1) when the agent logs in, and 2) when the agent logs out. The rule for enabled is if the agent is logged in, the enabled identifier for the enabled characteristic 402 is set. If the agent logs in, the enabled identifier for the enabled characteristic 402 is not enabled by the event service routine.

The rule 412 for the ready characteristic 403 is that an agent is ready if not on break and not processing a work item. If the agent is on break or processing a work item, the event service routine sets the identifier for the ready characteristic 403 to ready. Otherwise, the identifier for the ready characteristics 403 is set to not ready.

Figure 5:
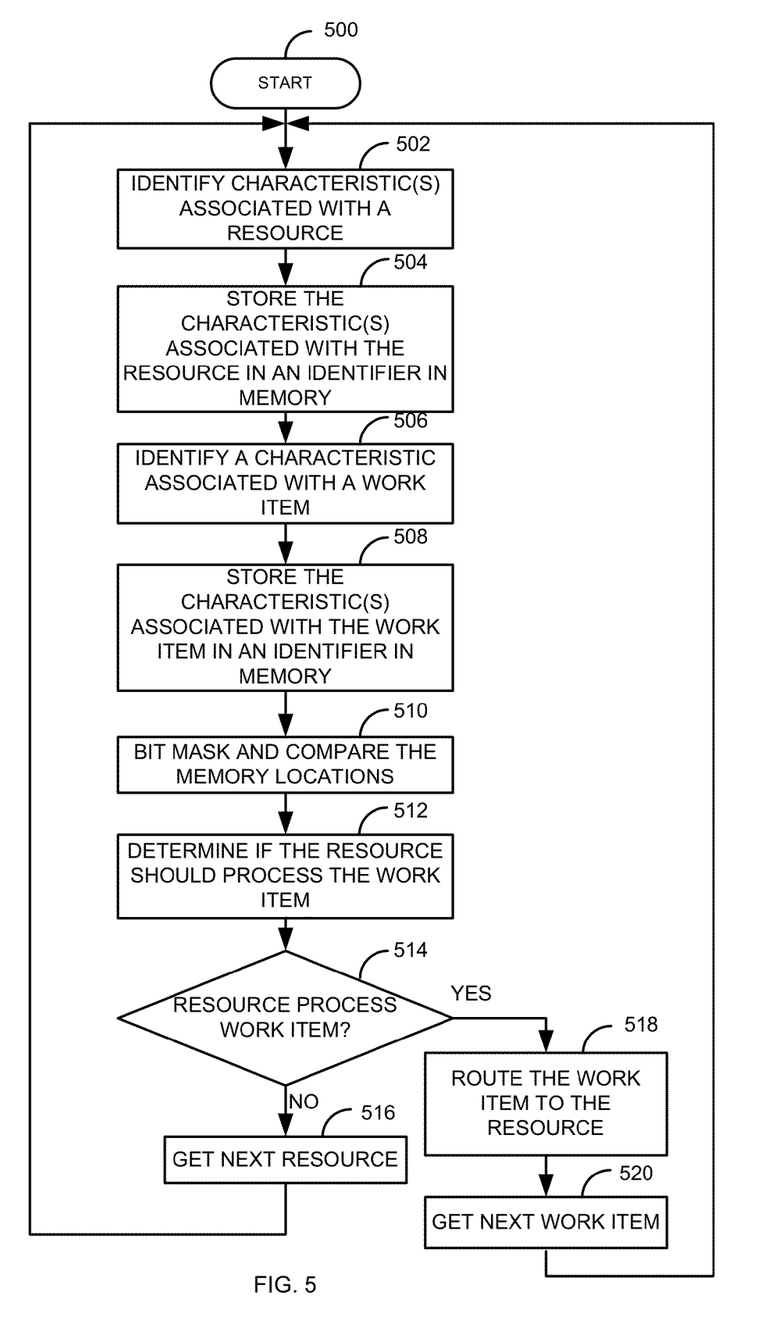
FIG. 5 is a flow diagram of a method for managing a contract center.

FIG. 5 is a flow diagram of a method for managing a contract center. Illustratively, the communication device 101, the contact center 120 and 320, the event detection module 123, the event queue 124, the work item pool 125, the work assignment module 126, the routing engine 127, the resource 130, the compiler 321, the code base 322, the abstract tree syntax 323, and the developer terminal 330 are stored-program-controlled entities, such as a computer or processor, which performs the method of FIGS. 5-8 and the processes described herein by executing program instructions stored in a tangible computer readable storage medium, such as a memory or disk. Although the methods described in FIGS. 5-8 are shown in a specific order, one of skill in the art would recognize that the steps in FIGS. 5-8 may be implemented in different orders and/or be implemented in a multi-threaded environment. Moreover, various steps may be omitted or added based on implementation.

The process starts in step 500. The process identifies 502 a characteristic(s) associated with a resource. The characteristic(s) associated with the resource is stored 504 in an identifier in a first memory location. The process identifies 506 a characteristic(s) associated with a work item. The characteristic(s) associated with the work item is stored 508 in an identifier in a second memory location. The first and second memory locations are bit masked and compared 510.

A determination is made if the resource should process the work item in step 512. If the resource is not to process the work item in step 514, the process gets 516 the next resource and goes to step 502. Otherwise, if the resource is to process the work item in step 514, the work item is routed 518 to the resource. The process gets 520 the next work item in a work item pool (if there is a resource in the work item pool.) and the process goes to step 502.

Figure 6:
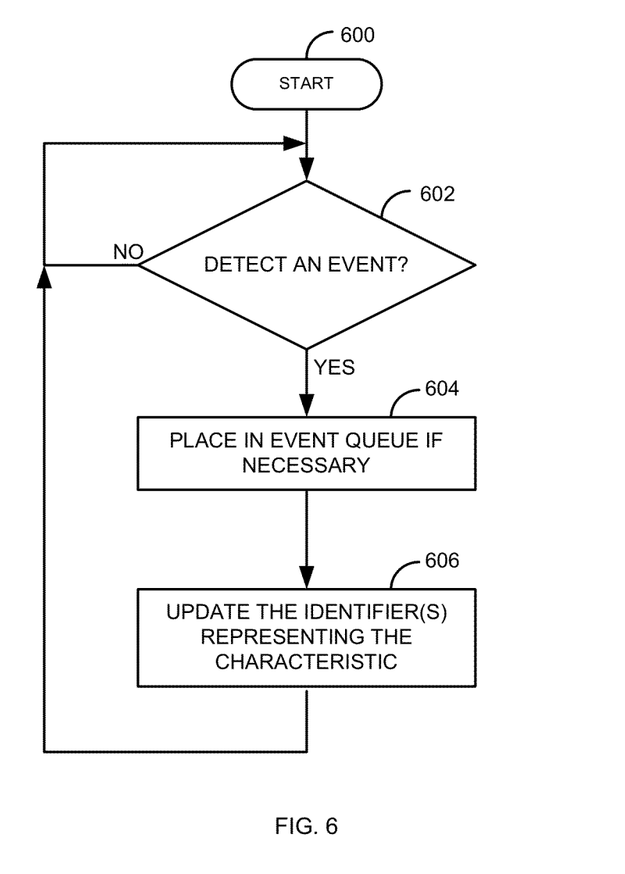
FIG. 6 is a flow diagram of a method for detecting an event and updating identifiers representing characteristics.

FIG. 6 is a flow diagram of a method for detecting an event and updating identifiers representing characteristics. The process starts 600. The process waits in step 602 for an event to occur. For example, the event may occur upon the completion of a voice work item, an agent logging in, the agent receiving an email, and/or the like. If an event has not occurred in step 602, the process goes back to step 602. Otherwise, if an event has occurred in step 602, the event is placed 604 in an event queue if necessary. An event may be placed in an event queue due to a heavy call volume in a contact center. The identifier(s) representing the characteristic is updated 606. For example, if the agent logs in, the event service routine will change the agent's status to enabled. The process then goes to step 602 to wait for the next event. The above process can be implemented for an individual resource or for multiple resources.

Figure 7:
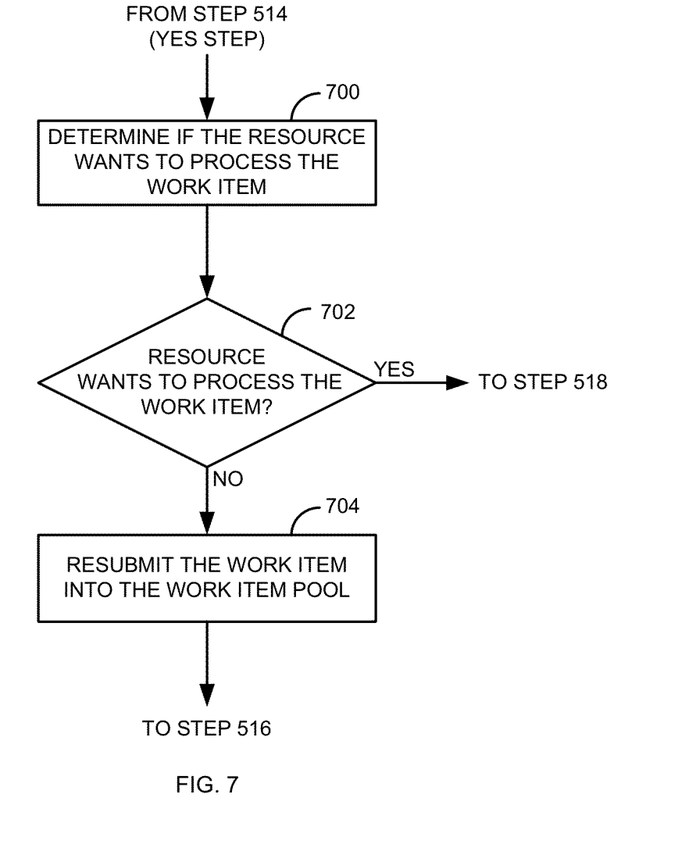
FIG. 7 is a flow diagram of a method for allowing a resource to process a work item.

FIG. 7 is a flow diagram of a method for allowing a resource to process a work item. The process described in FIG. 7 goes between step 514 (yes branch) and, steps 518 and 516 depending on the flow of the process. The process described in FIG. 7 may be optional based on the specific implementation. After determining that the resource will process the work item in step 514, the process determines 700 if the resource wants to process the work item. If the resource wants to process the work item in step 702, the process goes to step 518, where the work item is routed to the resource. Otherwise, if the resource does not want to process the work item in step 702, the work item is resubmitted 704 into the work item pool. The process then goes to step 516 to get another resource. A flag may be set to indicate that the resource does not want to process this work item so that the resource is not presented with this work item again.

Figure 8:
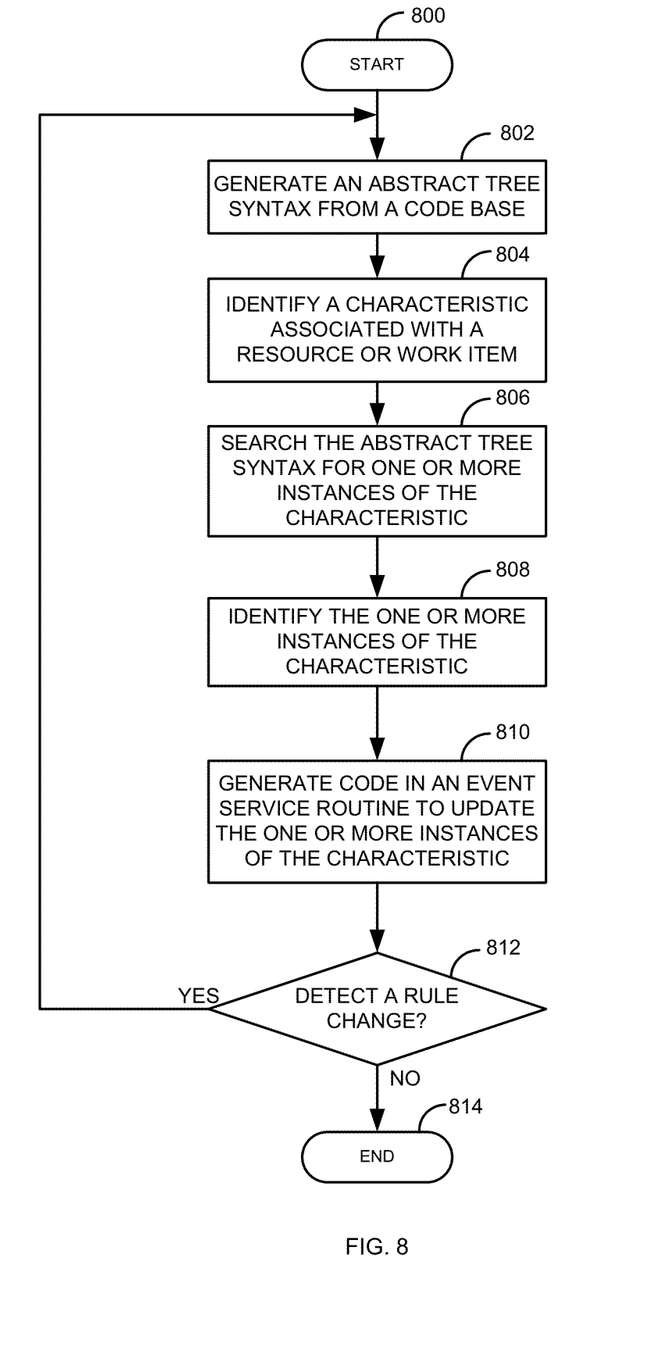
FIG. 8 is a flow diagram of a method for building code in a contact center.

FIG. 8 is a flow diagram of a method for building code in a contact center. The process starts 800. An abstract tree syntax is generated 802 from on a code base. A characteristic(s) associated with a resource or work item is identified 804. The characteristic associated with the resource or work item can be any of those described previously. The abstract tree syntax is searched 806 for one or more instances of the characteristic. The one or more instances of the characteristic are identified 808. Code is generated 810 in an event service routine. The code in the event service routine updates the one or more instances when the event occurs in the code base.

If a rule for the characteristic changes, the process can detect 812 the change in the rule. For example, by examining changes to code base. Based on the rule change, the abstract tree syntax is rebuilt in step 802. The compiler identifies any changes to the one or more instances of the characteristic in step 804. The compiler changes the code in the event service routine based on the rule change 806-810.

The compiler can create relationships between groups of agents, queues, sites, and characteristics. Based on these relationships, the rules may change and/or the instances of the characteristics may change.

Of course, various changes and modifications to the illustrative embodiment described above will be apparent to those skilled in the art. These changes and modifications can be made without departing from the spirit and the scope of the system and method and without diminishing its attendant advantages. The following claims specify the scope of the invention. Those skilled in the art will appreciate that the features described above can be combined in various ways to form multiple variations of the invention. As a result, the invention is not limited to the specific embodiments described above, but only by the following claims and their equivalents.

What is claimed is:

1. A method for routing a work item to a resource comprising:
   identifying a characteristic associated with a first resource, wherein an identifier representing the characteristic associated with the first resource is stored in a first memory location;
   identifying a characteristic associated with a work item, wherein an identifier representing the characteristic associated with the work item is stored in a second memory location;
   detecting an event;
   updating the identifier representing the characteristic associated with the first resource or the characteristic associated with the work item based the event;
   comparing the first memory location with the second memory location to determine if the first resource should process the work item; and
   in response to determining that the first resource should process the work item, routing the work item to the first resource.

2. The method of claim 1, wherein the identifier representing the characteristic associated with the first resource is derived from three characteristics associated with the first resource, wherein the three characteristics are enabled, ready, and interruptible, and wherein the first resource is an agent.

3. The method of claim 1, wherein the characteristic associated with the first resource comprises a plurality of characteristics associated with the first resource and wherein each of the plurality of characteristics associated with the first resource are associated with a rule or status.

4. The method of claim 1, wherein the characteristic associated with the work item comprises a plurality of characteristics associated with the work item and wherein each of the plurality of characteristics associated with the work item are associated with a rule or status.

5. The method of claim 1, wherein the characteristic associated with the first resource comprises a plurality of characteristics associated with the first resource and each of the plurality of characteristics associated with the first resource comprises a corresponding identifier stored in a bit in the first memory location, wherein the characteristic associated with the work item comprises a plurality of characteristics associated with the work item and each of the characteristics associated with the work item comprises a corresponding identifier stored in a bit in the second memory location, and wherein the bits that represent the plurality corresponding identifiers associated with the first resource are individually bit masked and compared with the bits that represent the plurality of corresponding identifiers associated with the work item.

6. The method of claim 1, wherein the characteristic associated with the first resource comprises a plurality of characteristics associated with the first resource and each of the plurality of characteristics associated with the first resource comprises a corresponding identifier stored in a bit in the first memory location, wherein the characteristic associated with the work item comprises a plurality of characteristics associated with the work item and each of the characteristics associated with the work item comprises a corresponding identifier stored in a bit in the second memory location, and wherein each bit in the first and second memory locations are bit masked and compared at the same time.

7. The method of claim 1, wherein comparing the first memory location with the second memory location to determine if the first resource should process the work item is accomplished using a bit mask.

8. The method of claim 1, wherein the event is placed in an event queue.

9. A method of claim 1, further comprising the steps of:
   determining if the first resource wants to process the work item;
   in response to determining that the first resource does not want to process the work item, resubmitting the work item into a work item pool; and
   determining if a second resource can process the work item.

10. A system for managing a contact center comprising:
   a work assignment module configured to identify a characteristic associated with a first resource, wherein an identifier representing the characteristic associated with the first resource is stored in a first memory location, identify a characteristic associated with a work item, wherein an identifier representing the characteristic associated with the work item is stored in a second memory location, and compare the first memory location with the second memory location to determine if the first resource should process the work item;
   an event detection module configured to detect an event and update the identifier representing the characteristic associated with the first resource or the characteristic associated with the work item based the event; and
   a routing engine configured to route the work item to the first resource in response to determining that the first resource should process the work item.

11. The system of claim 10, wherein the identifier representing the characteristic associated with the first resource is derived from three characteristics associated with the first resource, wherein the three characteristics are enabled, ready, and interruptible, and wherein the first resource is an agent.

12. The system of claim 10, wherein the characteristic associated with the first resource comprises a plurality of characteristics associated with the first resource and wherein each of the plurality of characteristics associated with the first resource are associated with a rule or status.

13. The system of claim 10, wherein the characteristic associated with the work item comprises a plurality of characteristics associated with the work item and wherein each of the plurality of characteristics associated with the work item are associated with a rule or status.

14. The system of claim 10, wherein the characteristic associated with the first resource comprises a plurality of characteristics associated with the first resource and each of the plurality of characteristics associated with the first resource comprises a corresponding identifier stored in a bit in the first memory location, wherein the characteristic associated with the work item comprises a plurality of characteristics associated with the work item and each of the characteristics associated with the work item comprises a corresponding identifier stored in a bit in the second memory location, and wherein the bits that represent the plurality corresponding identifiers associated with the first resource are individually bit masked and compared with the bits that represent the plurality of corresponding identifiers associated with the work item.

15. The system of claim 10, wherein the characteristic associated with the first resource comprises a plurality of characteristics associated with the first resource and each of the plurality of characteristics associated with the first resource comprises a corresponding identifier stored in a bit in the first memory location, wherein the characteristic associated with the work item comprises a plurality of characteristics associated with the work item and each of the characteristics associated with the work item comprises a corresponding identifier stored in a bit in the second memory location, and wherein each bit in the first and second memory locations are bit masked and compared at the same time.

16. The system of claim 10, wherein the work assignment module compares the first memory location with the second memory location to determine if the first resource should process the work item by using a bit mask.

17. The system of claim 10, wherein the event is placed in an event queue.

18. The system of claim 10, wherein the work assignment module is further configured to: determine if the first resource wants to process the work item, resubmit the work item into a work item pool, in response to determining that the first resource does not want to process the work item, and determine if a second resource can process the work item.

19. A non-transient computer readable medium having stored thereon instructions that cause a processor to execute a method, the method comprising:
- instructions to generate an abstract tree syntax from a code base;
- instructions to identify a characteristic associated with at least one of a resource or a work item;
- instructions to search the abstract tree syntax for one or more instances of the characteristic;
- instructions identifying the one or more instances of the characteristic; and
- instructions to generate code in an event service routine to update the identified one or more instances of the characteristic.

20. The computer readable medium of claim 19 further comprising:
- instructions to detect a rule change;
- instructions to rebuild the abstract tree syntax;
- instructions to identify any changes to the one or more instances of the characteristic; and
- instructions to change the code in the event service routine based on the rule change.

* * * * *